United States Patent [19]
Yen et al.

[11] Patent Number: 5,992,962
[45] Date of Patent: Nov. 30, 1999

[54] PRINT MASKS FOR INKJET PRINTERS

[75] Inventors: Jonathan Yen, San Jose; Qian Lin, Santa Clara; Ping Wah Wong, Sunnyvale, all of Calif.

[73] Assignee: Hewlett-Packard Company, Palo Alto, Calif.

[21] Appl. No.: 08/363,447

[22] Filed: Dec. 22, 1994

[51] Int. Cl.$^6$ .............................. B41J 2/01; B41J 2/145
[52] U.S. Cl. .................................. 347/9; 347/12; 347/37; 347/41
[58] Field of Search .................................. 347/9, 37, 40, 347/41, 12, 15, 43, 19, 23; 400/323

[56] References Cited

U.S. PATENT DOCUMENTS

| | | | |
|---|---|---|---|
| 4,748,453 | 5/1988 | Lin et al. | 347/41 |
| 4,963,882 | 10/1990 | Hickman | 347/41 |
| 4,965,593 | 10/1990 | Hickman | 347/12 |
| 4,967,203 | 10/1990 | Doan et al. | 347/41 |

FOREIGN PATENT DOCUMENTS

| | | | |
|---|---|---|---|
| 0 597 714 | 5/1994 | European Pat. Off. | H04N 1/18 |
| 0677390A1 | 10/1995 | European Pat. Off. | B41J 2/205 |
| 5-278232 | 10/1993 | Japan | 347/15 |
| 6-143618 | 3/1994 | Japan | 347/37 |

OTHER PUBLICATIONS

Lin, "Halftone image quality analysis based on a human vision model", IS&T/SPIE Int.Symp. on Electronic Imaging: Science & Technology, San Jose, CA, Feb. 1993.

Lin, "Improving Halftone Uniformity and Tonal Response", IS&T's Tenth International Congress on Advances in Non-Impact Printing Technologies (1994), pp. 377–380.

Ulichney, "The void–and–cluster method for dither array generation", Digital Equipment Corporation 1993.

Bayer, "An Optimum Method for Two–Level Rendition of Continuous–Tone Pictures", Eastman Kodak Company, Research Laboratories. 1973.

*Primary Examiner*—N. Le
*Assistant Examiner*—Craig A. Hallacher

[57] ABSTRACT

Various patterns, such as those derived from halftoning techniques, are applied to the design of print masks for inkjet printers to improve print quality. Print masks are used to control the firing sequence of the nozzles in a print head in multiple pass printing mode and thereby determine the nozzles that are to print in each particular media location. Such techniques as halftoning techniques have been used to print gray scale images with bi-level printing to produce bi-level patterns that can be perceived as gray density by human eyes from a viewing distance. State-of-the-art print masks typically provide checkerboard patterns that are not sufficient to handle severe print artifacts. A novel triangular clustering print mask that may be derived from halftoning techniques is applied to produce an imperceptible printed pattern that covers up the banding artifacts caused by defective print head nozzles. An alternative print mask that may be derived from a super smooth dithering matrix eliminates unpleasant artifacts caused by ink migration. Advanced halftoning techniques are applied to guide the ink migration in an imperceptible, super smooth dithering pattern. These print masking techniques have been demonstrated to be very effective in print quality improvement.

20 Claims, 10 Drawing Sheets

FIRST PASS

SECOND PASS

FIRST PASS    SECOND PASS

PRINT MASKS FOR INKJET PRINTERS

BACKGROUND OF THE INVENTION

1. Technical Field

The present invention relates to inkjet printers. More particularly, the present invention relates to an improved masking technique for reducing or eliminating banding artifacts and ink migration in output produced by inkjet printers.

2. Description of the Prior Art

State of the art inkjet printers form an image on a recording medium by depositing a pattern of ink drops onto the medium surface. FIG. 1 is a perspective view of a typical inkjet printer 10 which includes a plurality of print heads that are used alone and in combination to print color images on the recording medium 16. A complement of print heads includes a cyan print head ("C") 12, a yellow print head ("Y") 13, a magenta print head ("M") 14, and a black print head ("K") 15. By applying ink from these print heads in a specified pattern, the printer forms high resolution color images on the surface of the recording medium.

FIG. 2 is a perspective view of a typical print head of the type used with the printer shown in FIG. 1. The print head 20 is removably fitted into a recess (not shown) formed in the printer carriage. A contact array 22 makes an electrical connection between the print head and the printer to couple various control signals to the print head that determine when and where the print head is to discharge ink. An array of ink ports 24 (also referred to as ink discharge nozzles) is oriented such that ink is discharged substantially perpendicular to the plane of the recording medium 25.

The print head is operated to form a selected pattern on the nozzle array in accordance with the control signals applied thereto. Application of such control signals opens and muffles the various ink ports to produce a selected ink discharge pattern at each print location on the recording medium surface. The print locations are referred to as pixels; the process of producing the ink discharge pattern is referred to as masking.

In known printers, the print head is traversed back and forth across the surface of the recording medium to print a swath. The printing medium is incrementally advanced periodically to permit the array of print head nozzles to pass over another swath.

The image formed by the printer is built up incrementally on the surface of the recording medium from thousands of dots. The quality of the image is ultimately dependent upon the quality of the individual dots and their interrelationship to each other. Ideally, each dot is a generally circular, well formed spot of dried ink that fills its proper pixel to the pixel boundaries without extending into neighboring pixels.

A number of factors can prevent the formation of such an ideal array of dots. For example, horizontal bands can be seen consistently in the dark areas of images printed by inkjet printers. Such printers provide a color enhanced mode, and therefore are targeted toward high end users who require the highest possible print quality. The banding phenomenon in this mode is an undesirable print artifact and is considered unacceptable to most users. FIG. 3 shows a printed image produced by an inkjet printer, effectively 60× magnified, in which the banding phenomenon is pronounced (see, for example those portions of the image identified by numeric designators 31–33).

The cause of the banding phenomenon is thought to be a combination of many contributing factors that result in an inaccuracy in the positioning of one particular nozzle of the black ("K") pen. For example, print head related errors, such as differences in nozzle directionalities; and paper related errors, such as those introduced by printing from a planar print head nozzle array to a curved recording medium, and by sine/cosine deviations of the printer paper gear mechanism from a perfect circle are all thought to contribute to the banding problem.

In some instances, the banding problem may be attributed to particular print head nozzles. For example, among all the nozzles operating in a black print head having 96 nozzles, the 48th nozzle may be positioned a little too low, i.e. too close to the 49th nozzle. As shown in FIG. 3, under a video microscope with 60× magnification, a narrow faint white line followed by a dark band (e.g. bands 31–33) is clearly visible. As can be seen in the figure, not enough ink is deposited by the print head above the 48th nozzle line, while an overlap between the 48th and 49th nozzles shows that too much ink is deposited by the print head below the 48th nozzle line.

The banding artifact occurs in the color enhanced print mode, which is a 2-pass printing mode. FIG. 4 is a schematic diagram that shows the recording medium advanced one-half of the print head size after the first pass printing is completed, and before the second pass printing starts. It has been determined that the banding frequency is substantially one-half the print head width, i.e. every 48 nozzle lines in a 96-nozzle print head.

In the 2-pass print mode, each paper location is swept by the print head exactly twice. In the first pass (40), the print head deposits ink onto the recording medium for 96 pixel lines with one-half of the nozzles muffled by a mask. Then the print head advances for one-half of its size, that is, 48 pixel lines. In a second pass (42), the print head again deposits ink onto the recording medium with the other half of the nozzles muffled by another mask that must be complementary to the first mask. As shown in FIG. 4, there is a mask for the upper half of the first pass, referred to as 1-U; and a mask for the lower half of the first pass, referred to as 1-L. Similarly, masks are provided for the second pass, referred to as 2-U and 2-L, respectively. It can be seen in the figure that the first pass mask 1-U complements the second pass mask 2-L; and that the first pass mask 1-L complements the second pass mask 2-U.

The print masks used in most of the state of the art printers are variations of a checkerboard pattern. See, for example L. Lin, S. Classen, C. -H. Tsao, *Spot Deposition For Liquid Ink Printing*, U.S. Pat. No. 4,748,453, May 31, 1988. FIG. 5 is a schematic diagram that shows a 1 by 1 checkerboard print mask. Notice that the lower half of the print mask (i.e. nozzles 41–48) is a mirror image of the upper half of the print mask (i.e. nozzles 49–56). The disruption in checkerboard pattern along 48th and 49th nozzle lines is not a contributing factor to the banding problem. For further discussion of various known masking techniques, see M. Hickman, *Print Quality of Dot Printer*, U.S. Pat. No. 4,965, 593, Oct. 23, 1993 (a technique of using multiple nozzles per pixel or pixel row to mask nozzle defects, including shingling and the use of multiple nozzles to fill a given row of data); M. Hickman, *Printing of Pixel Locations By An Inkjet Printer Using Multiple Nozzles For Each Pixel or Pixel Row*, U.S. Pat. No. 4,963,882, Oct. 16, 1990 (using multiple nozzles per pixel or pixel row to mask nozzle defects; e.g. shingling techniques where multiple nozzles are used to fill a given row of data). It should be noted that all known print masks rely on masking nozzle defects exclusively by patterning the print mask, but do not permanently muffle defective nozzles.

Another problem encountered with inkjet printers is that of ink migration, in which droplets of ink coalesce during printing. Thus, if two neighboring pixels are to be printed, two droplets of ink are deposited onto the recording medium surface as the print head passes. Either the volume of ink is sufficiently large that the droplets of ink flow or bleed into each other before they can dry, or the surface of the recording medium lacks sufficient porosity to absorb the ink droplet of one pixel before an adjoining ink droplet is deposited onto the recording medium surface. The result in either case is run-together or improperly formed pixels.

The problem of ink migration is exacerbated when there are multiple pixels formed adjacent one another before sufficient time has elapsed to allow the ink to dry, such that the recording medium becomes saturated with a pool of ink. See, M. Hickman, *Print Quality of Dot Printer*, U.S. Pat. No. 4,965,593, Oct. 23, 1993, discussed briefly above.

While known techniques improve print quality, the banding and ink migration problems persist. It would be advantageous to provide a simple and effective solution that reduces or substantially eliminates banding and ink migration artifacts, while requiring only minimal modifications to current printer implementations.

SUMMARY OF THE INVENTION

The invention addresses the banding and ink migration problems for inkjet printers and provides a simple, effective, fast, and economical method for covering up banding and ink migration artifacts.

In a print head having 96-nozzles, the print mask turns off the 48th nozzle in the second pass, upper mask 2-U, and prints the entire line with the 96th nozzle in first pass, lower mask 1-L; and turns off the 49th nozzle in the first pass, lower mask 1-L, and prints the entire line with the 1st nozzle in second pass, upper mask 2-U. The invention applies various print mask patterns, such as a unique, asymmetric, complementary print mask having 4 by 4 triangular clusters to a print head during multiple pass printing. The print mask accomplishes the foregoing while at the same time providing a smoother transition from swath to swath. By the application of image analysis, it has been verified that the invention reduces or substantially eliminates the banding phenomenon.

Another embodiment of the invention applies such techniques as a super smooth dithering matrix to a print mask to reduce visible artifacts attributable to ink migration. This type of mask orients the ink migration in a controlled way, such that the artifacts are turned into small patterns that appear to be smooth to human eyes.

DETAILED DESCRIPTION OF THE INVENTION

The invention addresses the banding and ink migration problems for inkjet printers and provides a simple, effective, fast, and economical method for covering up banding and ink migration artifacts. The invention applies a unique print mask to a print head during multiple pass printing that uses the nozzles along the outer edges of the black print head to print in place of defective interior nozzles, while applying such techniques as halftoning techniques to smooth the transition from each printing pass. In a print head having 96-nozzles, the print mask turns off the 48th nozzle in the second pass, upper mask 2-U, and prints the entire line with the 96th nozzle in first pass, lower mask 1-L; and turns off the 49th nozzle in the first pass, lower mask 1-L, and prints the entire line with the 1st nozzle in second pass, upper mask 2-U. However, muffling defective nozzles and printing with complementary nozzles alone is not a particularly effective solution to the banding problem because the output produced by this technique is too abrupt and results in more visible artifacts.

Figure 6:
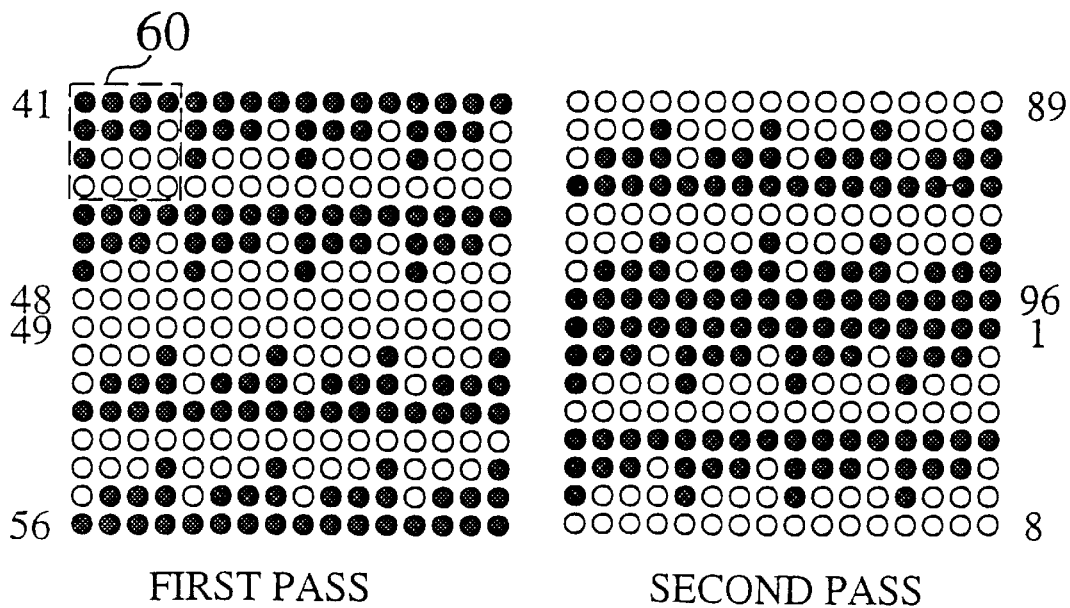
FIG. 6 is a schematic diagram that shows a print mask having 4 by 4 triangular tiling clusters according to a first preferred embodiment of the invention.

Thus, the preferred embodiment of the invention also provides a unique mask pattern, such as an asymmetric set of complementary masks. For example, in FIG. 6 a print mask having 4 by 4 triangular tiling clusters has been found to provide the best balance between reduction of banding artifacts and increase in image granularity. In the figure, a 4 by 4 pattern 60 is repeated for each of the first pass, lower mask 1-L for pixel lines 1–48 (shown for pixel lines 41–48 above the next occurring first pass, upper mask). That is, a triangular tiling mask is applied to the print head, such that those nozzles shown as black dots are allowed to print, while those nozzles shown as open dots are muffled. The 4 by 4 pattern is a triangular pattern that is repeated in the first pass, lower mask, for example for pixel lines 1–48.

The first pass, upper mask 1-U, which is applied to pixel lines 49–96, is a complement to the first pass, lower mask 1-L. That is, instead of progressing from solid black dots to open dots in a repeated triangular pattern for each 4 by 4 mask matrix, the mask pattern progresses from open dots to solid black dots in a complementary, triangular pattern. Thus, when the second pass is printed, the second pass, upper mask 2-U prints black dots over those areas of the first pass, lower mask where the ink nozzles were muffled (that is, where open dots are shown). The process is similar for the second pass, lower mask 2-L and the first pass, upper mask 1-U. Accordingly, the second pass completes the print pattern for each pixel location by printing complementary ink droplets in those areas that were masked during the first pass. It has been found that the repeated triangular 4 by 4 pattern described herein provides the advantages of turning off the 48th nozzle in the second pass, upper mask 2-U, and printing the entire line with the 96th nozzle in first pass, lower mask 1-L (and turning off the 49th nozzle in the first pass, lower mask 1-L, and printing the entire line with the 1st nozzle in second pass, upper mask 2-U), while avoiding the abrupt transition associated with that technique. The mask herein described accordingly reduces or substantially eliminates the banding phenomenon. It should be appreciated that various other mask patterns may be applied in accordance with the invention to reduce effectively undesired print artifacts.

The clustering matrix applied herein may be derived from such techniques, for example as various known halftoning techniques, i.e. techniques that are used to produce continuous-tone images from two-level renditions. See, for example B. Bayer, An *Optimum Method For Two-Level Rendition Of Continuous-Tone Pictures Proceedings* of the IEEE International Conference on Communications, pp. 26.11–26.15, 1973 (a dither pattern in which the apparent brightness of a rendition is controlled by the presence or absence of fixed-size dots on a regular picture lattice).

The mask herein described is implemented in the control signals applied to the print head. Thus, conventional techniques used to open and muffle the various nozzles in the print head nozzle array are applied in such fashion to provide the herein described print mask. It is expected that such implementation is best provided in the form of a replacement program memory for existing printers, or as a hardware or software driver for newly manufactured printers. The actual implementation of the print mask in either hardware or software formats is considered to be within the skill of those who have knowledge of the inkjet printer arts, when this skill is applied in view of the teachings herein.

Figure 1:
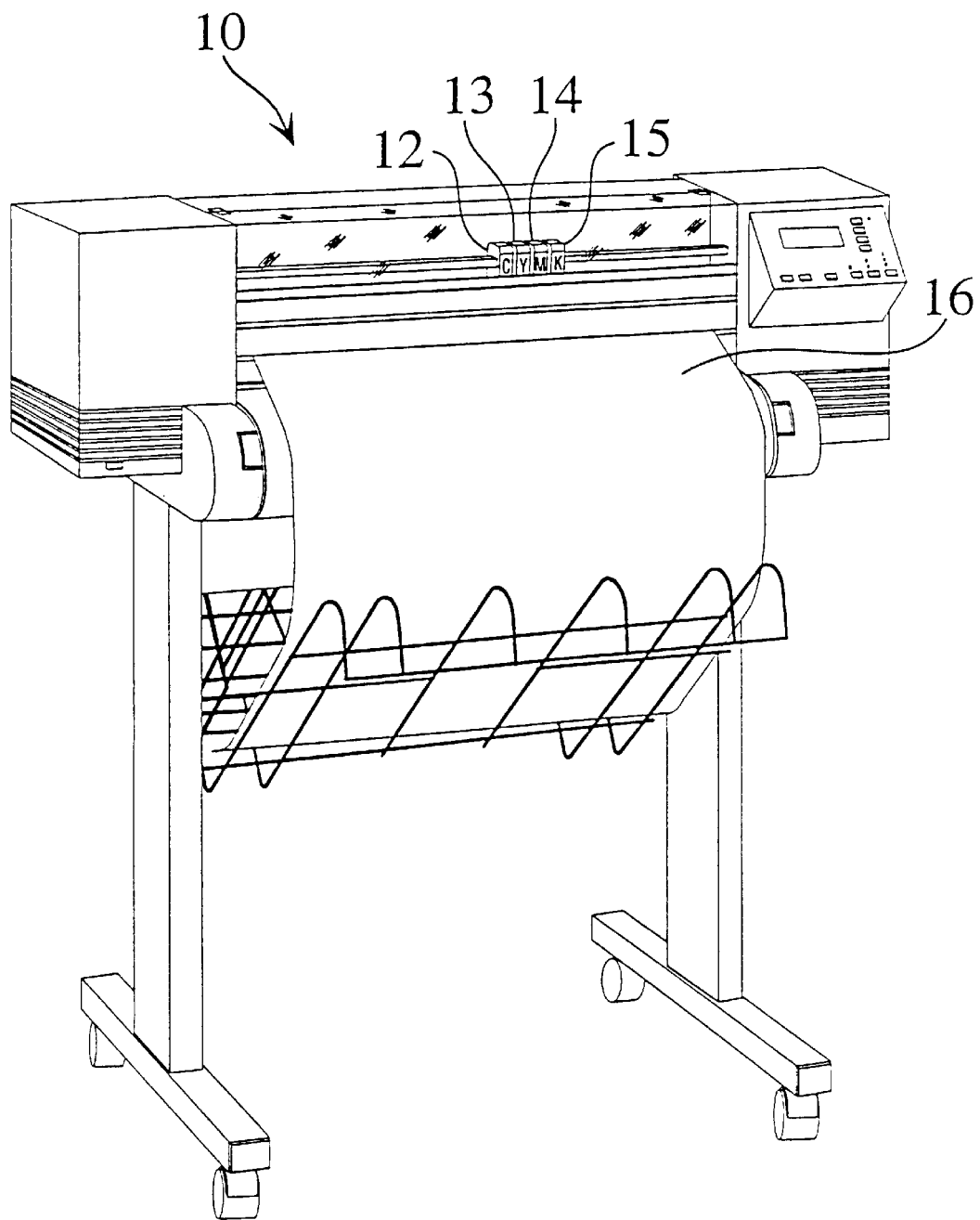
FIG. 1 is a perspective view of a typical inkjet printer that includes a plurality of print heads that are used alone and in combination to print color images on the recording medium.
Figure 2:
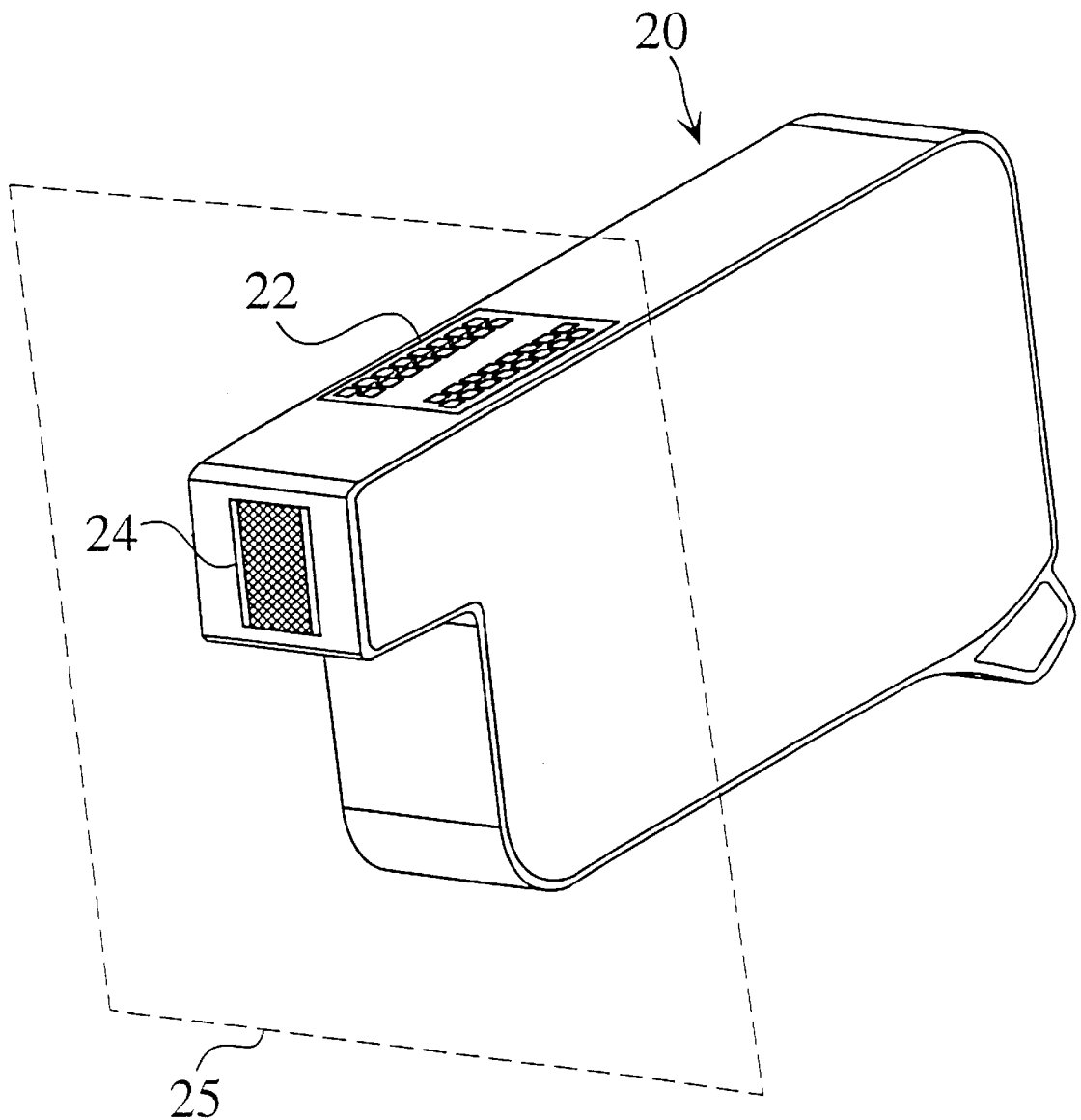
FIG. 2 is a perspective view of a typical print head of the type used with the printer shown in FIG. 1.
Figure 3:
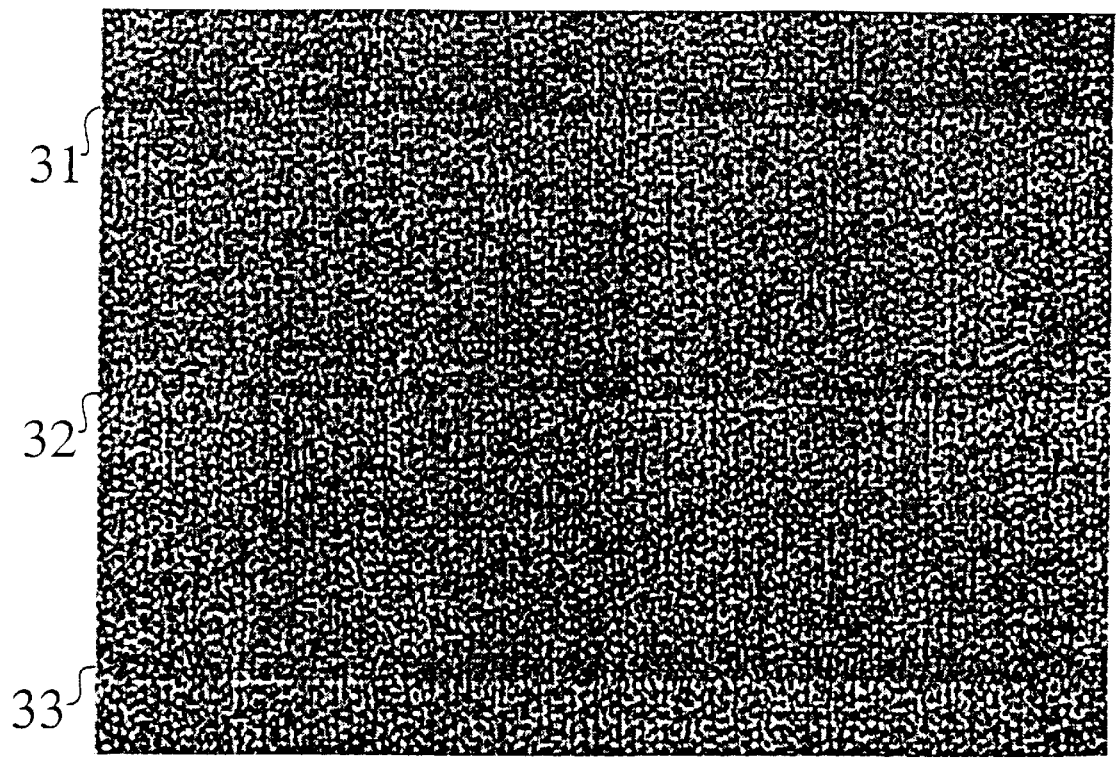
FIG. 3 is a printed image produced by an inkjet printer, effectively 60× magnified, showing a banding phenomenon.
Figure 5:
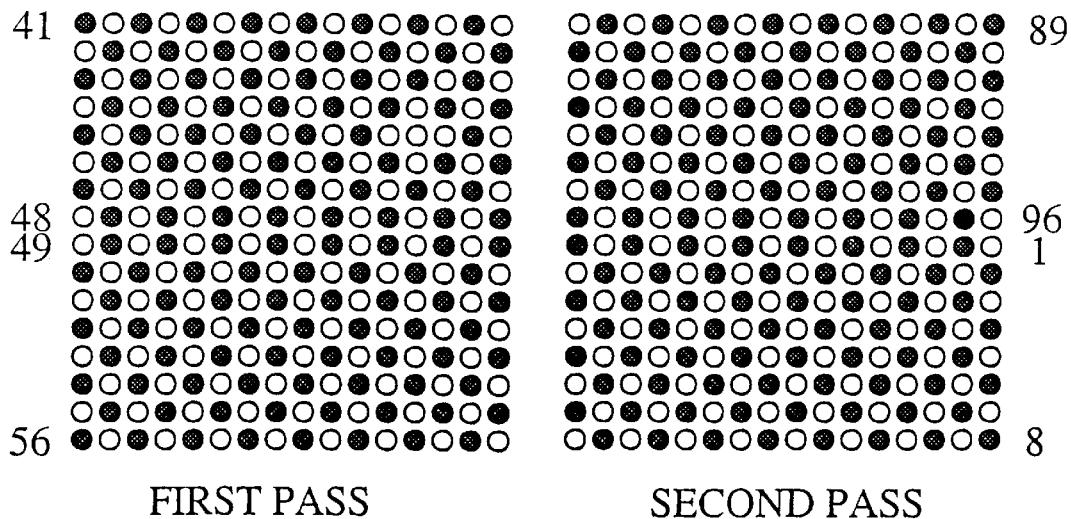
FIG. 5 is a schematic diagram that shows a 1 by 1 checkerboard print mask.
Figure 7:
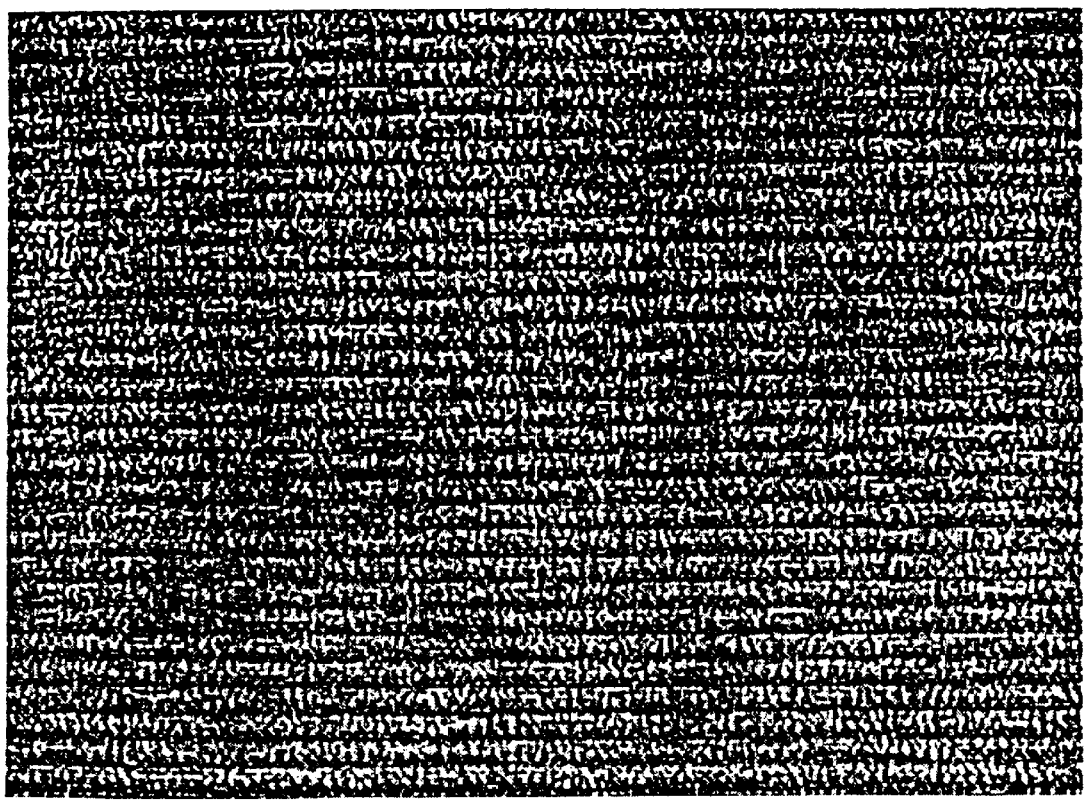
FIG. 7 is printed image produced by an inkjet printer in accordance with the invention, effectively 60× magnified, showing the banding artifact reduced from that of the original image shown in FIG. 3.

FIG. 7 is printed image produced by an inkjet printer in accordance with the invention, effectively 60× magnified, showing the banding artifact reduced from that of the original image shown in FIG. 3. By the application of image analysis, it has been verified that the invention reduces or substantially eliminates the banding phenomenon. To measure the amount of banding reduction produced by the invention, the average of intensity of each of the images shown in FIG. 3 and FIG. 5 is first calculated across the vertical direction, i.e. perpendicular to the direction of the horizontal bands. A low pass filter is then applied to the averaged intensity to simulate the characteristics of the human vision system. The low pass filter is obtained by applying the human vision model described in Q. Lin, *Halftone Image Quality Analysis Based on a Human Vision Model*, IS&T/SPIE Int. Symp. on Electronic Imaging: Science & Technology, San Jose, Calif., February 1993.

Figure 8:
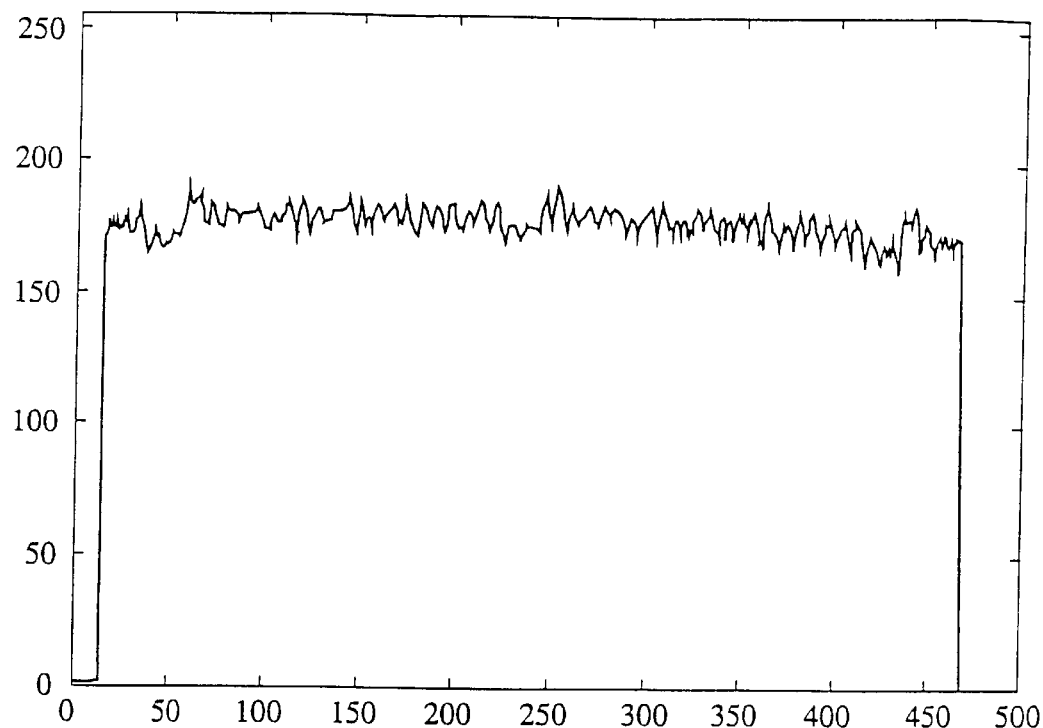
FIG. 8 is a graph showing an averaged intensity plot of the original image shown in FIG. 3.
Figure 9:
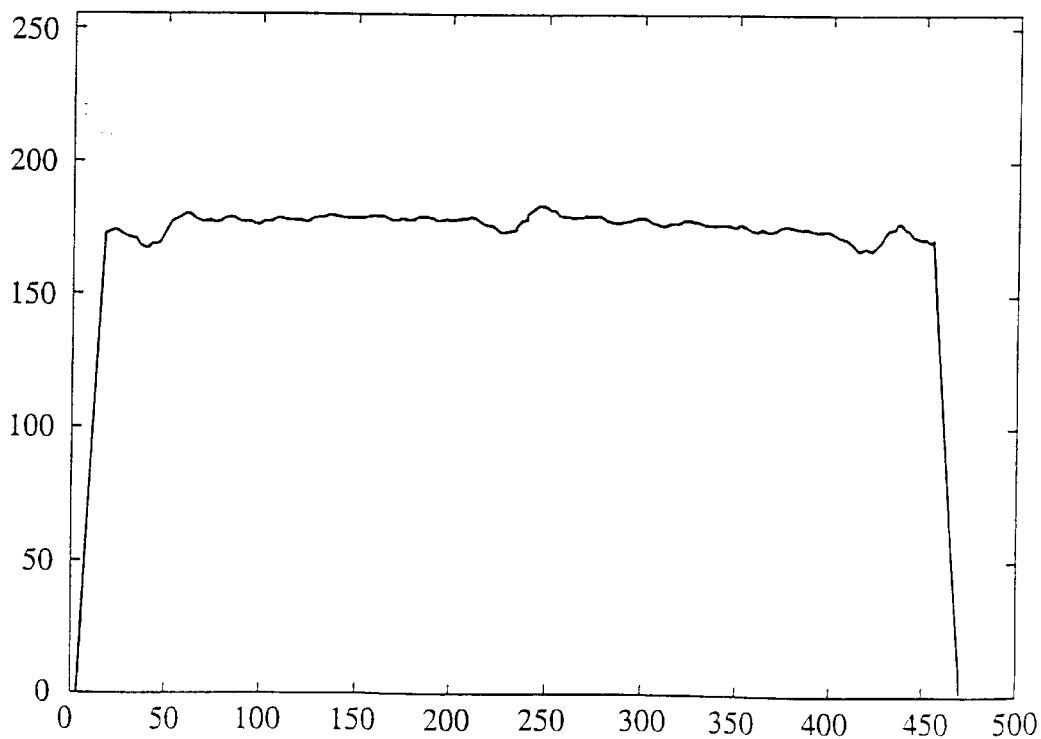
FIG. 9 is a graph showing a low pass filtered intensity plot of the original image shown in FIG. 3.

FIG. 8 is a graph showing an averaged intensity plot of the original image shown in FIG. 3; and FIG. 9 is a graph showing a low pass filtered intensity plot of the original image shown in FIG. 3. Notice that the three regular patterns in both plots coincide with the three bands (31–33) shown in FIG. 3.

Figure 10:
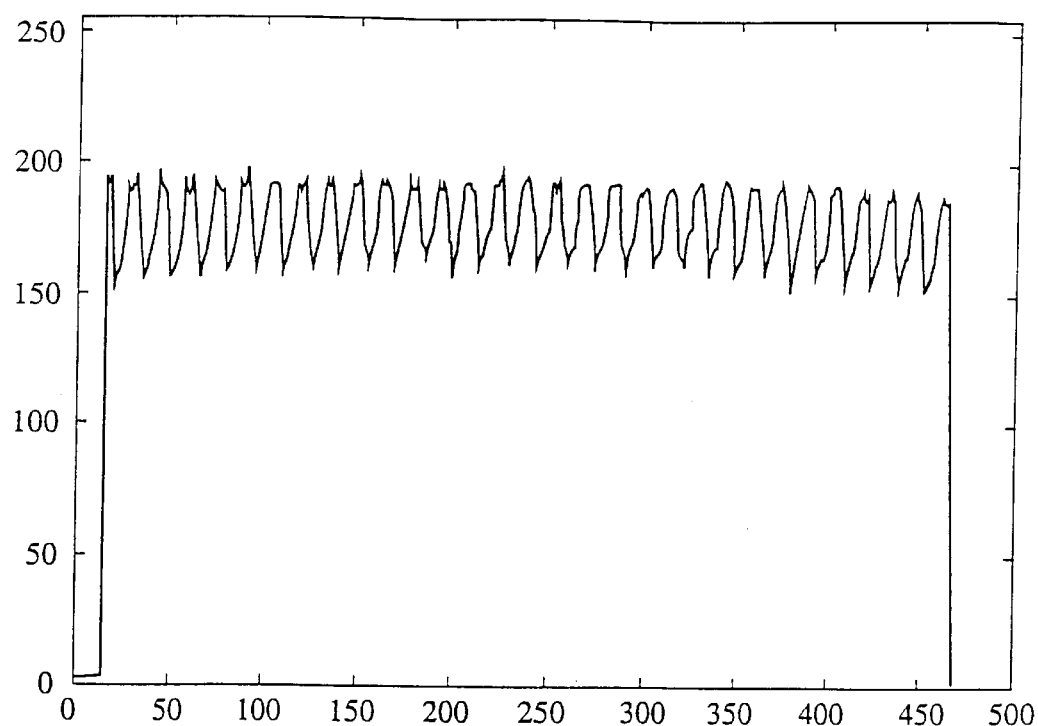
FIG. 10 is a graph showing the averaged intensity plot of the new image shown in FIG. 7 and produced in accordance with the invention.
Figure 11:
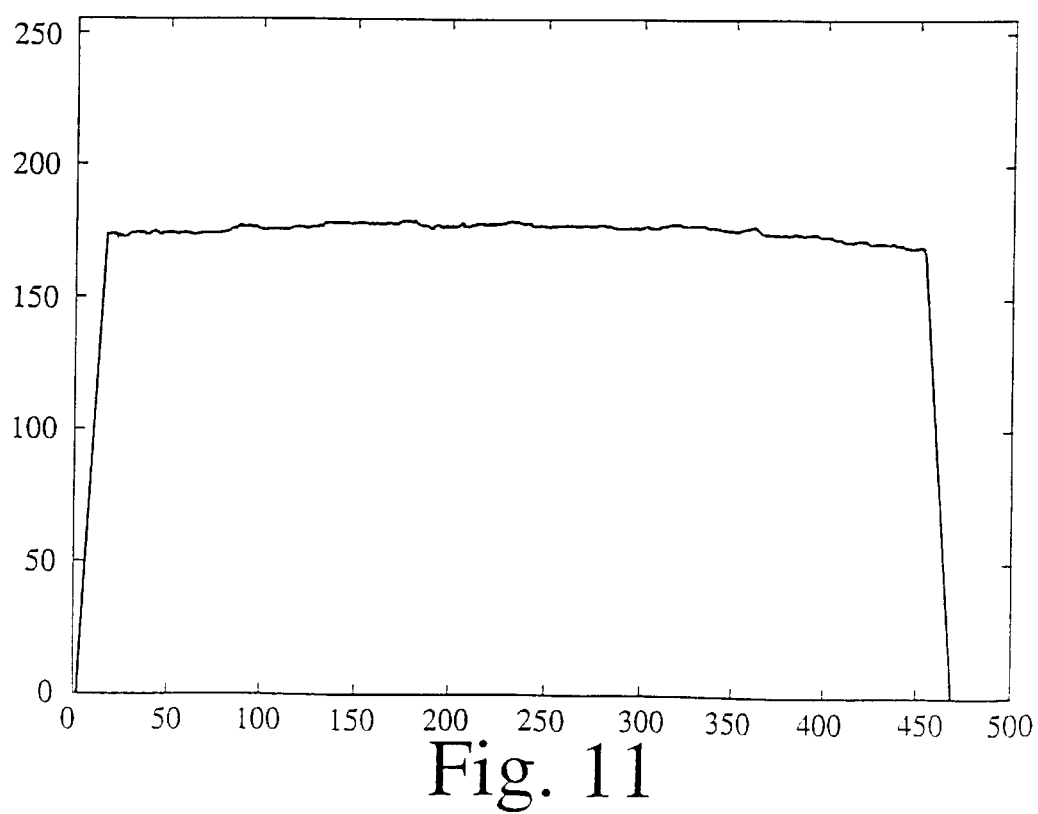
FIG. 11 is a graph showing the low pass filtered intensity plot of the new image shown in FIG. 7 and produced in accordance with the invention.

FIG. 10 is a graph showing the averaged intensity plot of the new image shown in FIG. 7; and FIG. 11 is a graph showing the low pass filtered intensity plot of the new image shown in FIG. 7. Notice that the regular patterns in previous plots, which indicate the presence of banding, have disappeared in the plots shown in FIGS. 10 and 11. Thus, FIGS. 10 and 11 show that the invention is effective in reducing or substantially eliminating banding artifacts.

Figure 12:
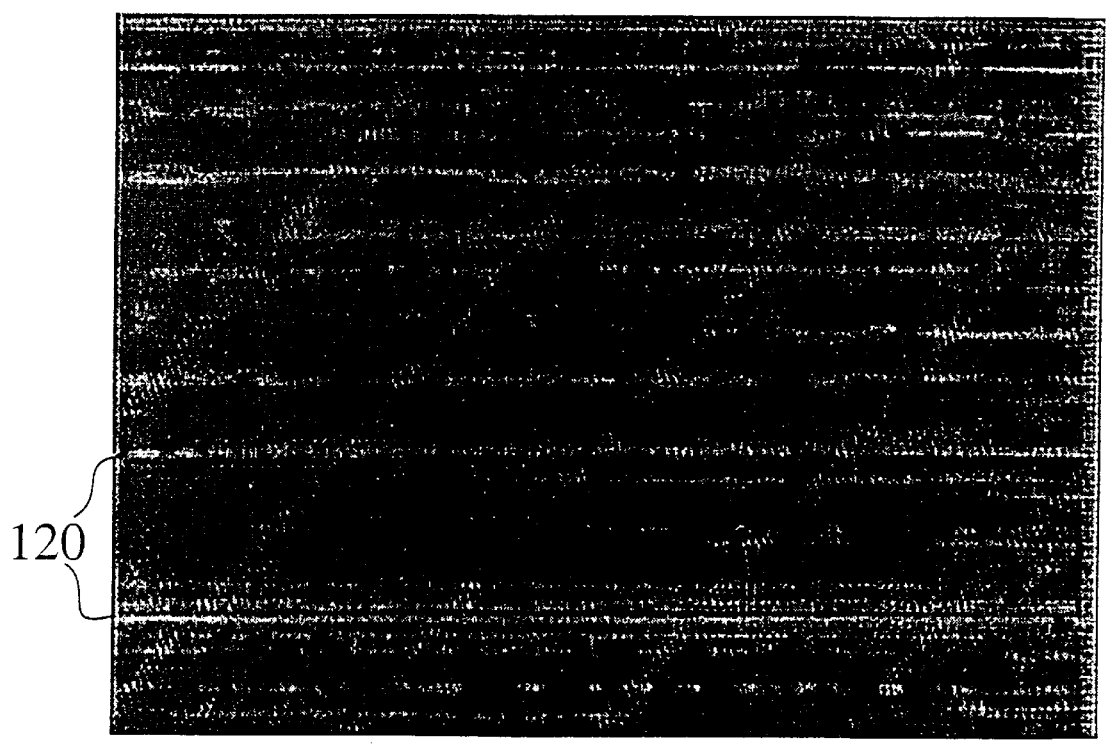
FIG. 12 is a printed image produced by an inkjet printer, effectively 20× magnified, showing an ink migration phenomenon.

FIG. 12 is a printed image produced by an inkjet printer using a 1 by 1 checkerboard print mask, effectively 20× magnified, showing the ink migration phenomenon discussed above. As shown in FIG. 12, several irregular, lighter areas (e.g. 120) are clearly visible. These areas occur randomly across the image and produce an objectionable discontinuity in the appearance of the image. Substitution of other known checkerboard mask patterns did not alleviate the apparent discontinuity in the appearance of the image caused by ink migration. While the foregoing halftoning techniques are known for producing halftone images, they have not been applied for other purposes.

Figures 4, 13:
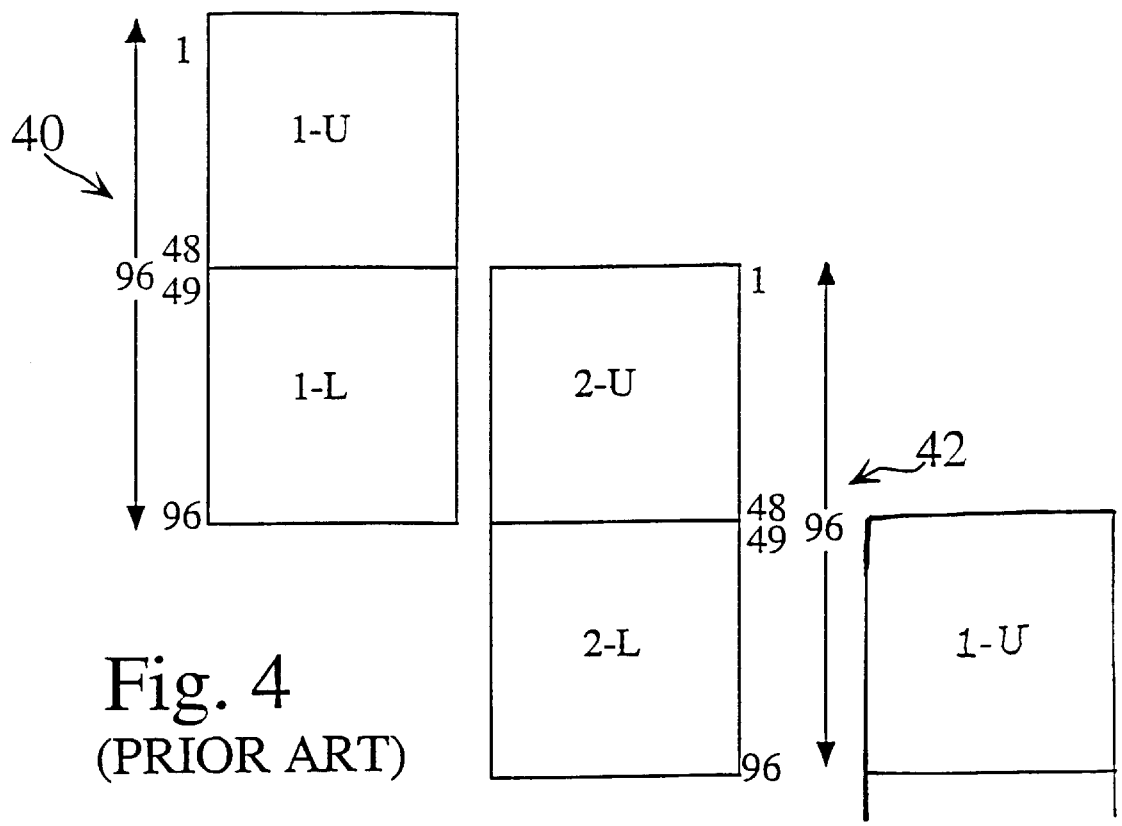
FIG. 4 is a schematic diagram that shows the recording medium advanced one-half of the print head size after the first pass printing is completed, and before the second pass printing starts.
FIG. 13 is a schematic diagram that shows a print mask derived from a super smooth dithering matrix according to a second, equally preferred embodiment of the invention.

FIG. 13 is a schematic diagram that shows an assymetric print mask derived, for example, from a super smooth dithering matrix according to a second, equally preferred embodiment of the invention. This embodiment of the invention exploits the recognition that a halftoning technique, such as the use of a super smooth dithering matrix, provides a print mask that produces a subtly patterned print image in which the visible effects of ink migration are minimized or substantially eliminated. While gray scale and other techniques may be applied to the print data to produce a desired print image, the invention provides a print mask that allows the print head to print the image in a way that guides the ink migration into patterns that are not perceivable to the human eye. It should be appreciated that various other print masks may be produced in accordance with the invention to guide the ink migration into imperceptible patterns.

In the invention, a halftone-like pattern is applied to the print mask. The actual pattern used to smooth ink migration is a result of an engineering design tradeoff, although it has been found that the generation of a print mask from a super smooth dithering matrix produces the best results in the presently preferred embodiment of the invention. Application of the super smooth dithering technique usually involves a large matrix, e.g. 128 by 128. Given a desired image intensity, this super smooth dithering matrix produces a dotted pattern that is provably smooth when viewed from a distance. The process of generating a super smooth dithering matrix is described in R. Ulichney, *The void-and-cluster method for dither array generation*, Proceedings of SPIE, vol. 1913, Human Vision, Visual Processing, and Digital Display IV, pp. 332–343, February 1993 (a method for generating homogenous ordered dither arrays built by identifying voids and clusters in intermediate patterns and relaxing the voids and clusters to optimize isotropy); and Q. Lin, *Improving Halftone Uniformity and Tonal Response*, Proceedings of IS&T Non-impact Printing Conference, pp. 377–380, November 1994 (an algorithm that incorporate a printer dot model and an adaptive filter to improve uniformity and tonal response of halftone patterns generated by the void-and-cluster algorithm).

However, a super smooth dithering matrix may not directly solve the problem of perceptible ink migration because the original matrix yields a tile that might be too large with regard to hardware limitations. One aspect of the invention provides a submatrix in which an 8 by 8 portion of the upper left section of the original matrix is used to produce a halftone pattern. The halftone pattern provides a print mask design that yields the desired result of applying ink to the recording medium such that ink migration produces an imperceptible pattern. It should be appreciated that one aspect of the super smooth dithering matrix is that a fair-sized submatrix of the original matrix is provably able to reproduce roughly the same density, which in the invention is preferably 50%. It is presently preferred to use an 8 by 8 matrix to achieve the best balance between image smoothness and tile granularity, although the actual size of the submatrix is a matter of engineering design tradeoff. The original super smooth dithering matrix may be calculated for the both the desired image smoothness and tile granularity.

Figure 14:
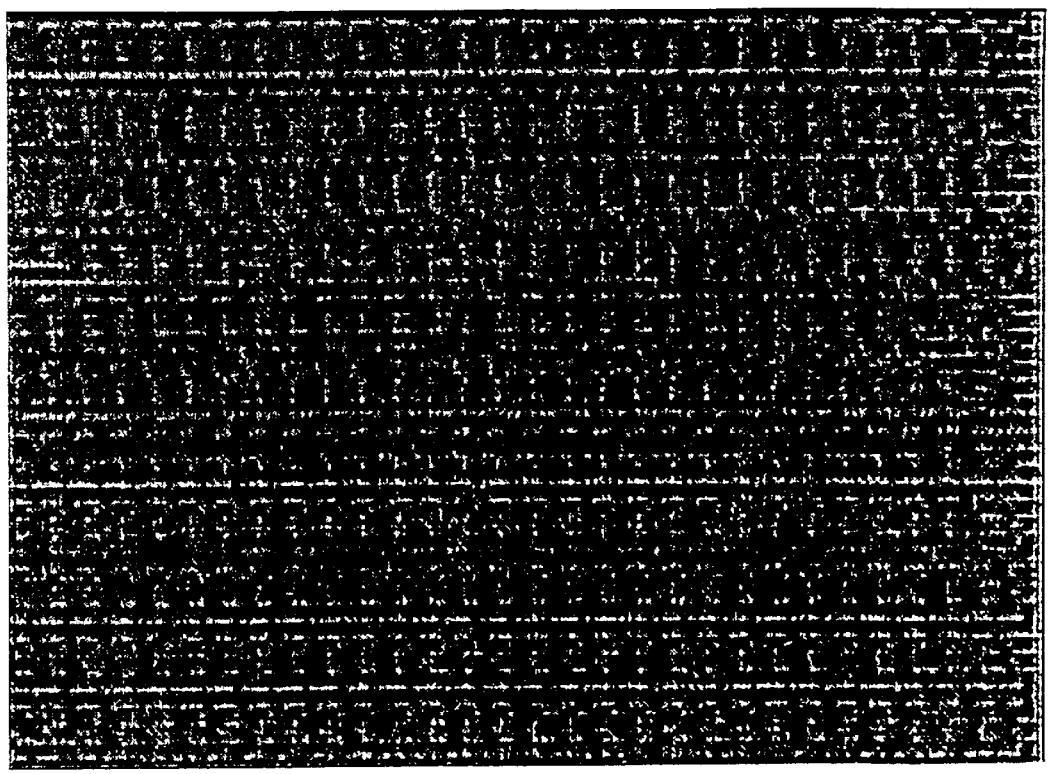
FIG. 14 is printed image produced by an inkjet printer in accordance with the invention, effectively 20× magnified, showing the ink migration artifact reduced from that of the original image shown in FIG. 12.

FIG. 14 is printed image produced by an inkjet printer in accordance with the invention, effectively 20× magnified, showing the ink migration artifact reduced from that of the original image shown in FIG. 12. In place of the random discontinuity that results from ink migration, the image has a pleasing textured appearance.

There are several advantages to the invention, including at least the following:

1. The masking techniques described herein are applied as a post process. Thus, there is no interference to upstream processes, such as image halftoning or color separation. The approach described herein is implemented in an isolated step that removes or eliminates banding and/or ink migration at the final print stage. Regardless of how the images are generated, the approach herein does not change the original image data, nor does it add pixels to, or delete pixels from, the image formed on the recording medium.

2. The masking techniques described herein are implemented in a printer with only minimal modification to the current printer implementation. The approach herein described only alters the firing sequence of the nozzles of the black print head, while leaving the firing sequence of the color print heads unchanged.

3. The masking techniques described herein is fast and economical. The approach herein described is implemented in a 2-pass, single-dot print mode as opposed to a 4-pass, multi-dot print mode that is currently used in the industry. Because the invention is implemented in a 2-pass system, rather than a 4-pass system, the approach herein provides faster printing than the currently used solutions to the banding and ink migration problems. Because the approach herein does not consume extra ink, it is less expensive and it does not worsen paper cockling.

Although the invention is described herein with reference to the preferred embodiment, one skilled in the art will readily appreciate that other applications may be substituted for those set forth herein without departing from the spirit and scope of the present invention. For example, the mask pattern may be derived from a halftone pattern that may be, in turn, combined with a second mask pattern that is derived from the asymmetric masking technique described above, or each technique may be used independently of the other. Additionally, the invention is readily applied to multiple pass printing, e.g. three or more passes. Accordingly, the invention should only be limited by the claims included below.

We claim:

1. A print mask for an inkjet printer in multiple-pass print mode, including at least one printhead having a plurality of ink discharge nozzles, comprising:

a first mask matrix, defining a nozzle pattern derived from halftoning techniques;

at least a second mask matrix, defining a nozzle pattern derived from halftoning techniques, said at least a second mask providing a complementary pattern to said first mask matrix; and means for muffling at least one nozzle of said ink discharge nozzles in each of said first mask matrix and said second mask matrix, such that, in a first print pass, a defective nozzle in said first mask matrix is disabled, and in a second print pass, a nozzle, in said second mask matrix and having a printing position corresponding to a printing position of said disabled first mask matrix defective nozzle, prints in place thereof, such that the printing of said nozzle is in a complementary pattern to the printing of said defective nozzle, and in said second print pass, a defective nozzle in said second mask matrix is disabled, and in said first print pass, a nozzle, in said first mask matrix and having a printing position corresponding to a printing position of said disabled defective nozzle, prints in place thereof, such that the printing of said nozzle is in a complementary pattern to the printing of said disabled second mask matrix defective nozzle, to substantially reduce or eliminate printing artifacts generated by said defective nozzle.

2. The mask of claim 1, wherein said mask matrices are produced in accordance with a clustering halftone algorithm.

3. The mask of claim 1, wherein said mask matrices are each a 4 by 4 matrix.

4. The mask of claim 1, wherein said mask matrices have a generally triangular tiling shape.

5. The mask of claim 1, wherein said mask matrices are derived from combined halftoning techniques.

6. A method for generating a print mask for an inkjet printer in multiple-pass print mode, including at least one printhead having a plurality of ink discharge nozzles, comprising the steps of:

generating a first mask matrix, defining a nozzle pattern derived from halftoning techniques;

generating at least a second mask matrix, defining a nozzle pattern derived from a halftoning technique, said at least a second mask matrix providing a complementary pattern to said first mask matrix;

muffling at least one nozzle of said ink discharge nozzles in each of said first mask matrix and said second mask matrix, such that, in a first print pass, a defective nozzle in said first mask matrix is disabled, and in a second print pass, a nozzle, in said second mask matrix and having a printing position corresponding to a printing position of said disabled first mask matrix defective nozzle, prints in place thereof, such that the printing of said nozzle is in a complementary pattern to the printing of said defective nozzle, and in said second print pass, a defective nozzle in said second mask matrix is disabled, and in said first print pass, a nozzle, in said first mask matrix and having a printing position corresponding to a printing position of said disabled defective nozzle, prints in place thereof, such that the printing of said nozzle is in a complementary pattern to the printing of said disabled second mask matrix defective nozzle, to substantially reduce or eliminate printing artifacts generated by said defective nozzle.

7. The method of claim 6, where said mask matrices are produced in accordance with a clustering halftone technique.

8. The method of claim 6, wherein said mask matrices are each a 4 by 4 matrix.

9. The method of claim 6, wherein said mask matrices each have a generally triangular tiling shape.

10. The method of claim 6, further comprising the step of:
combining at least one pattern derived from a first halftoning technique with at least one pattern derived from a second halftoning technique to form said mask.

11. A print mask for an inkjet printer in multiple-pass print mode, including at least one printhead having a plurality of ink discharge nozzles, comprising:
a first asymmetric mask matrix, said mask matrix defining a halftone nozzle pattern derived from a halftoning technique; and
at least a second asymmetric mask matrix, said at least a second mask matrix defining a complementary halftone nozzle pattern to said first mask matrix said complementary halftone pattern derived from a halftoning technique;
wherein at least one nozzle of said ink discharge nozzles is muffled in each of said first mask matrix and said second mask matrix, such that, in a first print pass, a defective nozzle in said first mask matrix is disabled, and in a second print pass, a nozzle, in said second mask matrix and having a printing position corresponding to a printing position of said disabled first mask matrix defective nozzle, prints in place thereof, such that the printing of said nozzle is in a complementary pattern to the printing of said defective nozzle, and in said second print pass, a defective nozzle in said second mask matrix is disabled, and in said first print pass, a nozzle, in said first mask matrix and having a printing position corresponding to a printing position of said disabled defective nozzle, prints in place thereof, such that the printing of said nozzle is in a complementary pattern to the printing of said disabled second mask matrix defective nozzle, to substantially reduce or eliminate printing artifacts generated by said defective nozzle.

12. The mask of claim 11, wherein said mask matrices are produced in accordance with a super smooth dithering algorithm.

13. The mask of claim 11, wherein said mask matrices are each 8 by 8 matrices.

14. The mask of claim 11, wherein said mask matrices derived from a submatrix of a super smooth dithering algorithm.

15. The mask of claim 11, wherein said mask matrices are derived from combined halftoning patterns.

16. A method for generating a print mask for an inkjet printer in multiple-pass printing mode, including at least one printhead having a plurality of ink discharge nozzles, comprising the steps of:
generating a first asymmetric mask matrix, said mask matrix defining a halftone nozzle pattern derived from a halftoning technique; and
generating at least a second asymmetric mask matrix, said at least a second matrix defining a complementary halftone pattern to said first mask matrix, said complementary halftone pattern derived from a halftoning technique;
wherein at least one nozzle of said ink discharge nozzles is muffled in each of said first mask matrix and said second mask matrix, such that, in a first print pass, a defective nozzle in said first mask matrix is disabled, and in a second print pass, a nozzle, in said second mask matrix and having a printing position corresponding to a printing position of said disabled first mask matrix defective nozzle, prints in place thereof, such that the printing of said nozzle is in a complementary pattern to the printing of said defective nozzle, and in said second print pass, a defective nozzle in said second mask matrix is disabled, and in said first print pass, a nozzle, in said first mask matrix and having a printing position corresponding to a printing position of said disabled defective nozzle, prints in place thereof, such that the printing of said nozzle is in a complementary pattern to the printing of said disabled second mask matrix defective nozzle, to substantially reduce or eliminate printing artifacts generated by said defective nozzle.

17. The method of claim 16, further comprising the step:
producing said halftone patterns in accordance with a super smooth dithering algorithm.

18. The method of claim 16, wherein said mask matrices are each 8 by 8 matrices.

19. The method of claim 16, further comprising the step of:
deriving said mask matrix from a submatrix of a super smooth dithering algorithm.

20. The method of claim 16, wherein said mask matrices (have superimposed thereover at least one additional pattern) are derived from (at least one other) combined halftoning patterns.

* * * * *